United States Patent
Sturm et al.

(10) Patent No.: US 7,654,725 B2
(45) Date of Patent: Feb. 2, 2010

(54) DEGASSING OF FLOWABLE MASSES IN A MULTIPLE-SCREW EXTRUDER

(75) Inventors: Achim-Phillipp Sturm, Niederuzwil (CH); Jürgen Schweikle, Niederhelfenschwil (CH); Andreas Christel, Zuzwil (CH); Federico Innerebner, Zurich (CH)

(73) Assignee: Buhler AG, Uzwil (CH)

( * ) Notice: Subject to any disclaimer, the term of this patent is extended or adjusted under 35 U.S.C. 154(b) by 896 days.

(21) Appl. No.: 10/483,308

(22) PCT Filed: Jun. 13, 2002

(86) PCT No.: PCT/CH02/00320

§ 371 (c)(1), (2), (4) Date: Oct. 28, 2004

(87) PCT Pub. No.: WO03/020493

PCT Pub. Date: Mar. 13, 2003

(65) Prior Publication Data
US 2005/0105382 A1    May 19, 2005

(30) Foreign Application Priority Data
Sep. 5, 2001    (DE) .............................. 101 43 570

(51) Int. Cl.
*B29B 7/48*    (2006.01)
(52) U.S. Cl. ......................... 366/85; 425/204
(58) Field of Classification Search .................. 366/75, 366/76.4, 85, 301; 425/204; 264/211.23
See application file for complete search history.

(56) References Cited

U.S. PATENT DOCUMENTS 1,356,296 A * 10/1920 La Casse ................... 366/76.4

(Continued)

FOREIGN PATENT DOCUMENTS

DE    198 54 689 A    6/2000

(Continued)

*Primary Examiner*—David L Sorkin
(74) *Attorney, Agent, or Firm*—Francis C. Hand; Carella, Byrne, Bain et al.

(57) ABSTRACT

The invention relates to a multiple-screw extruder that comprises a first process chamber (1) and a second process chamber (2). In the degassing zones of said extruder, at least the first process chamber is provided with at least one degassing opening. The radius R of the conveyor element in the degassing zones, in at least one conveyor element (7; 9) of at least one screw (5, 7; 5, 9) configured as a passage screw, in a subsection configured as a passage subsection (71a, 71e; 91a, 91e), along the peripheral direction of the at least one conveyor element (7; 9) is by ΔR smaller than the full radius Rv of the conveyor element (6; 8) required for the mutual stripping of adhering product in a closely intermeshing screw operation with die adjacent conveyor elements (6; 8) of adjacent conventional screws (5, 6; 5, 8). The invention also relates to a method for degassing viscous or elasticoviscous flowable masses in such a multi-screw extruder having several process chambers, the respective process chambers communicating by means of a connecting opening.

4 Claims, 5 Drawing Sheets

U.S. PATENT DOCUMENTS

| | | | |
|---|---|---|---|
| 2,968,836 A * | 1/1961 | Colombo | 366/75 |
| 3,104,420 A * | 9/1963 | Selbach | 366/85 |
| 3,254,367 A * | 6/1966 | Erdmenger | 366/85 |
| 3,310,837 A * | 3/1967 | Wittrock | 366/76.1 |
| 4,300,839 A * | 11/1981 | Sakagami | 366/85 |
| 5,743,178 A * | 4/1998 | Babbini | 100/127 |
| 5,836,682 A | 11/1998 | Blach | |
| 6,190,031 B1 * | 2/2001 | Blach et al. | 366/75 |
| 6,838,496 B1 * | 1/2005 | Goedicke et al. | 523/343 |
| 7,040,798 B2 * | 5/2006 | Innerebner et al. | 366/76.3 |
| 7,080,935 B2 * | 7/2006 | Innerebner et al. | 366/85 |
| 2004/0094862 A1 * | 5/2004 | Sturm et al. | 264/211 |

FOREIGN PATENT DOCUMENTS

EP    0 788 868 A    8/1997

* cited by examiner $R = R(\varphi, x)$

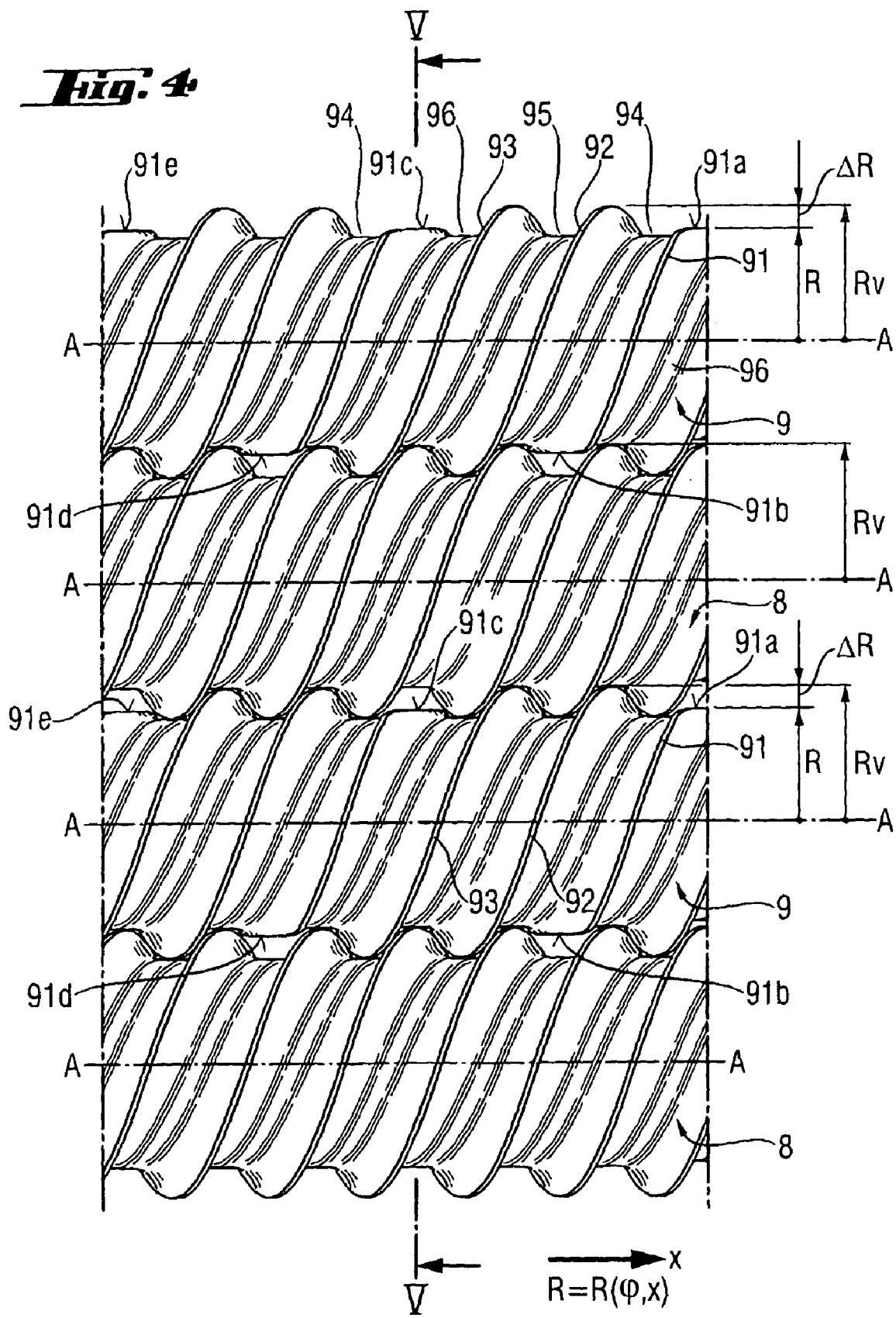

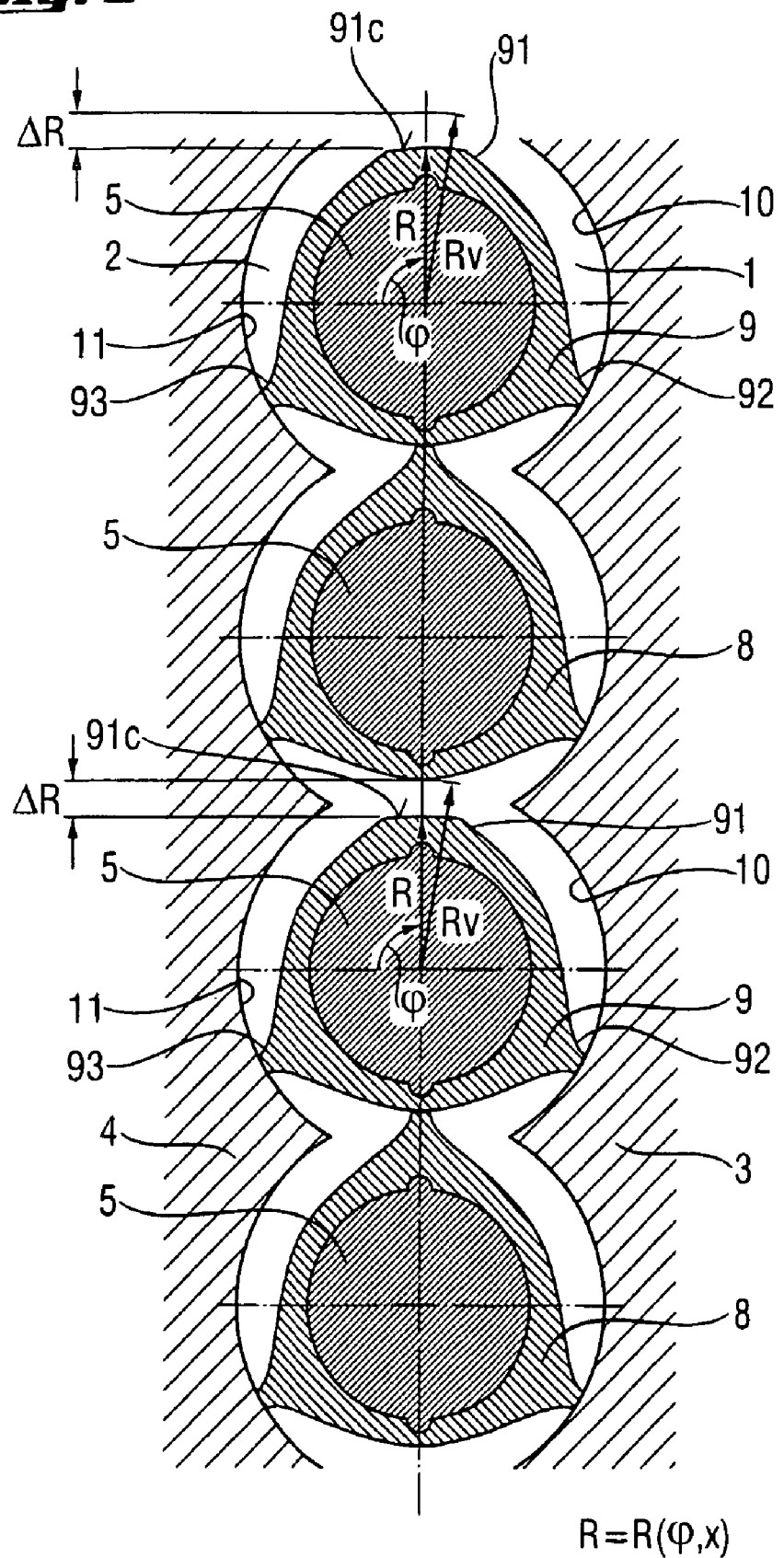

DEGASSING OF FLOWABLE MASSES IN A MULTIPLE-SCREW EXTRUDER

The present invention relates to a multiple-screw extruder and a method of degassing viscous or viscoelastic flowable masses in a multiple-screw extruder having multiple process chambers.

For the degassing of viscous masses, such as polyester melts, or viscoelastic masses, such as rubber mixtures, in a multiple-screw extruder, the mass to be degassed is typically distributed within the multiple-screw extruder in multiple process chambers depending on the arrangement of the screws, which are equipped with processing elements.

In known multiple-screw extruders and methods of the type initially cited, these process chambers are separated from one another in at least some sections along the extruder conveyance direction (lengthwise direction), either by screws having closely intermeshing and mutually stripping conveyor elements, so that hardly any material exchange (neither gas nor mass) occurs between neighboring process chambers in these chambers, or they are connected to one another by regions in which one or more screws has no processing element, so that material exchange (gas and mass) may occur between the process chambers.

For multiple-screw extruders having multiple process chambers, until now either closely intermeshing or non-closely intermeshing conveyor elements were always used, so that either a stripping, self-cleaning effect of neighboring screws was achieved, but practically without any material exchange between the process chambers, or a noticeable material exchange is achieved between the process chambers, but without the stripping, self-cleaning effect of neighboring screws. This is especially disadvantageous if regions of this type having conveyor elements are located in the region of degassing openings of the extruder.

The present invention is therefore based on the object, in a multiple-screw extruder having multiple process chambers of the construction initially cited, of ensuring both a self-cleaning effect of the conveyor elements and material exchange between different process chambers, particularly in the region of the degassing zones.

Further advantages, features, and possible applications of the present invention result from the following description of two exemplary embodiments of the present invention with reference to the attached drawing, in which:

FIG. 4 is a schematic view of a detail of the arrangement of the screws in the second exemplary embodiment of the multiple-screw extruder according to the present invention, the first process chamber being positioned below the plane of the drawing and the second process chamber being positioned above the plane of the drawing.

FIG. 5 is a sectional view of the sectional plane V-V of FIG. 4.

Figure 1:
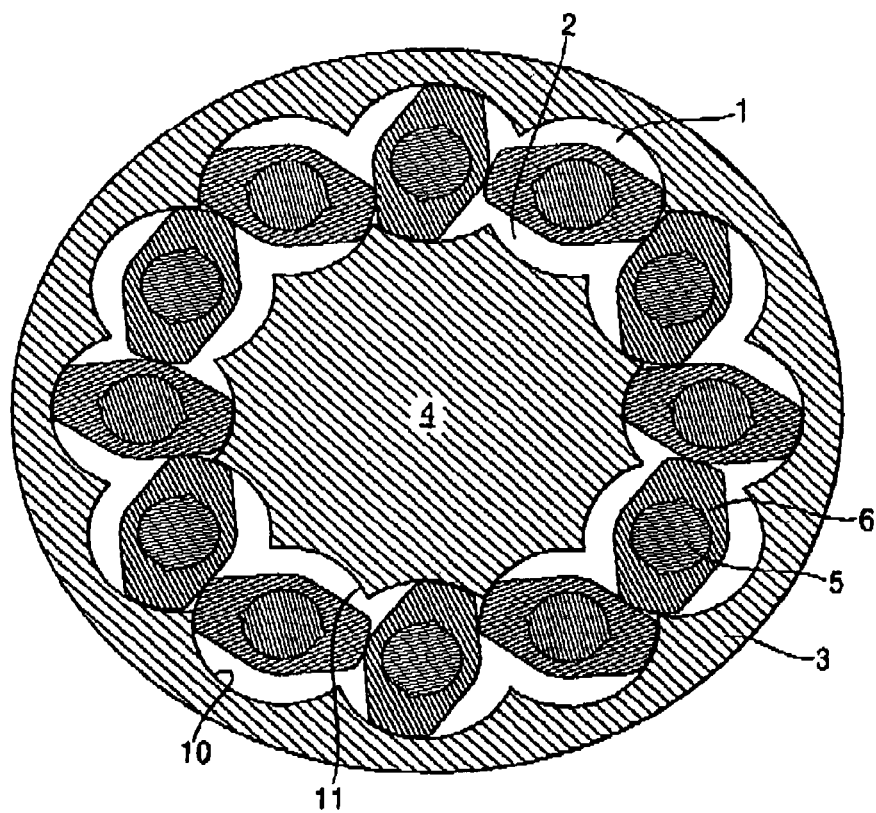
FIG. 1 is a schematic sectional view perpendicular to the conveyance and/or lengthwise direction of a ring extruder of the related art.

FIG. 1 is a sectional view of a ring extruder of the related art along a sectional plane perpendicular to the conveyance and/or lengthwise direction of the extruder. In this case, the ring extruder includes 12 screws 5 positioned parallel to the lengthwise and/or conveyance direction of the extruder like a collar, each of which carries a double-threaded conveyor element 6. The 12 screws 5 positioned like a collar are implemented as closely intermeshing, so that the outer process chamber 1 of the ring extruder is separated from the inner process chamber 2 of the ring extruder. The screws 5 positioned like a collar are mounted between a housing 3 and a core 4, which is fixed in relation to the housing. The face of the housing 3 which faces toward the screw collar appears in the cross-sectional view as the outer flower 10. The face of the core 4 which faces toward the screw collar appears in cross-section as an inner flower 11.

Figure 2:
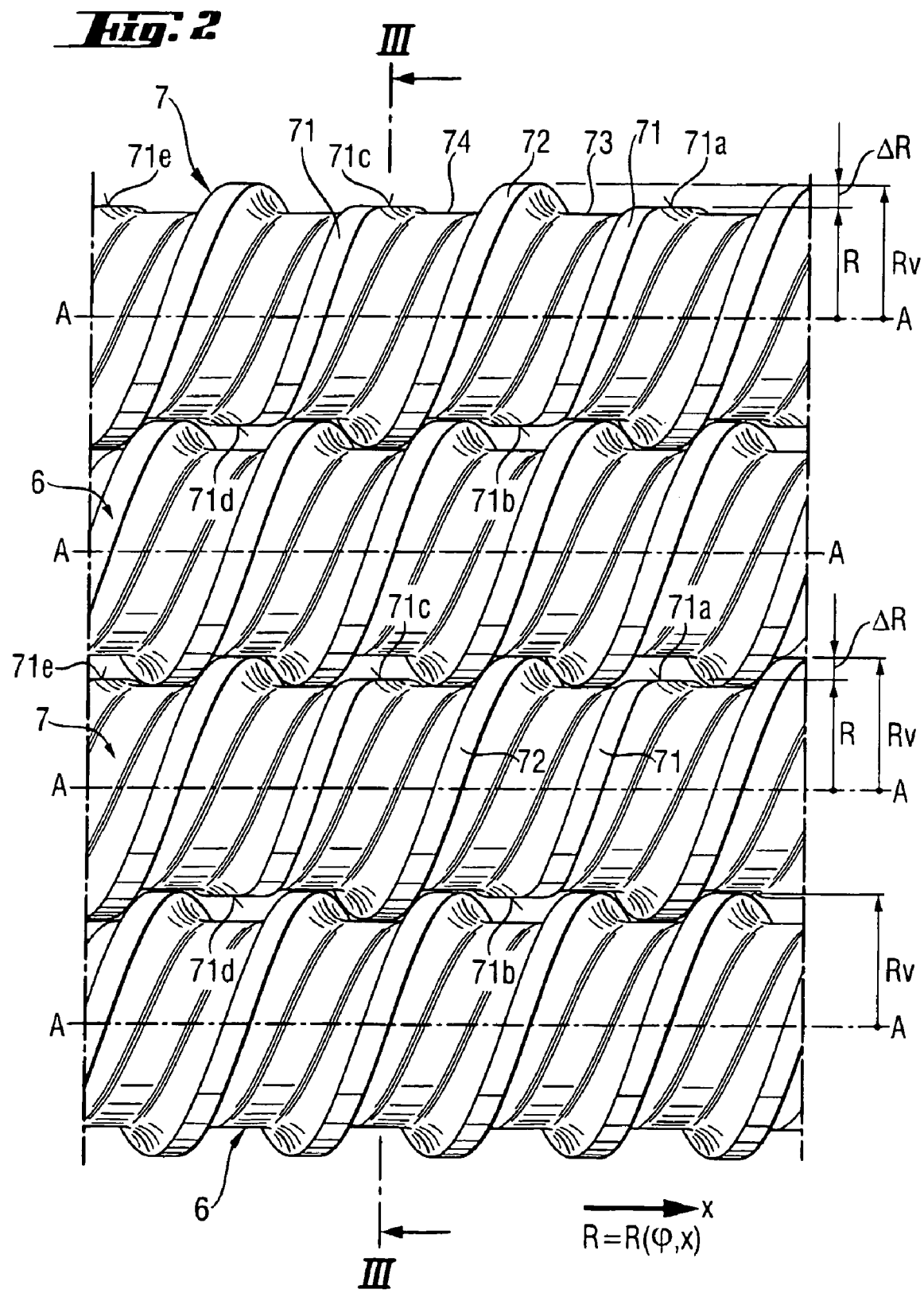
FIG. 2 is a schematic view of a detail of the arrangement of the screws in a first exemplary embodiment of the multiple-screw extruder according to the present invention, the first process chamber being positioned below the plane of the drawing and the second process chamber being positioned above the plane of the drawing.

FIG. 2 is a schematic view of a detail of the screw arrangement in a first exemplary embodiment of the multiple-screw extruder according to the present invention, whose conveyor elements 6, 7 are each implemented as double-threaded conveyor elements. In order to simplify the illustration, the 4 conveyor elements illustrated are shown lying next one another in one plane (plane of the drawing). In reality, however, they may be positioned both in a plane and like a collar on a cylindrical surface, as in a ring extruder, for example. The conveyor elements 6, 7 are double-threaded conveyor elements, double-threaded conveyor elements 6 without clipping and double-threaded conveyor elements 7 with clipping following one another alternately. The clipping in the clipped double-threaded conveyor elements 7 is produced in that, for the first land 71, this land is clipped by an amount $\Delta R$ in subsections 71a, 71b, 71c, 71d and 71e of the first land 71, so that in these regions the radius R is reduced by a differential amount $\Delta R$ in relation to the complete radius Rv. In the present case, the clipped regions 71a, 71b, 71c, 71d and 71e of the first land 71 are each offset by 180° around the circumference of the conveyor element 7, the second land 72 remaining without clipping. During operation of the extruder, this allows both material exchange along the lengthwise direction A between the two neighboring threads 73 and 74 of the conveyor element 7 and material exchange between the first process chamber 1 (FIG. 3) and the second process chamber 2 (FIG. 3) of the extruder. A material exchange occurs during operation of the extruder via the passage subsections 71a, 71b, 71c, 71d and 71e. In this case, both gas and molten mass may change over from the first process chamber 1 into the second process chamber 2.

Figure 3:
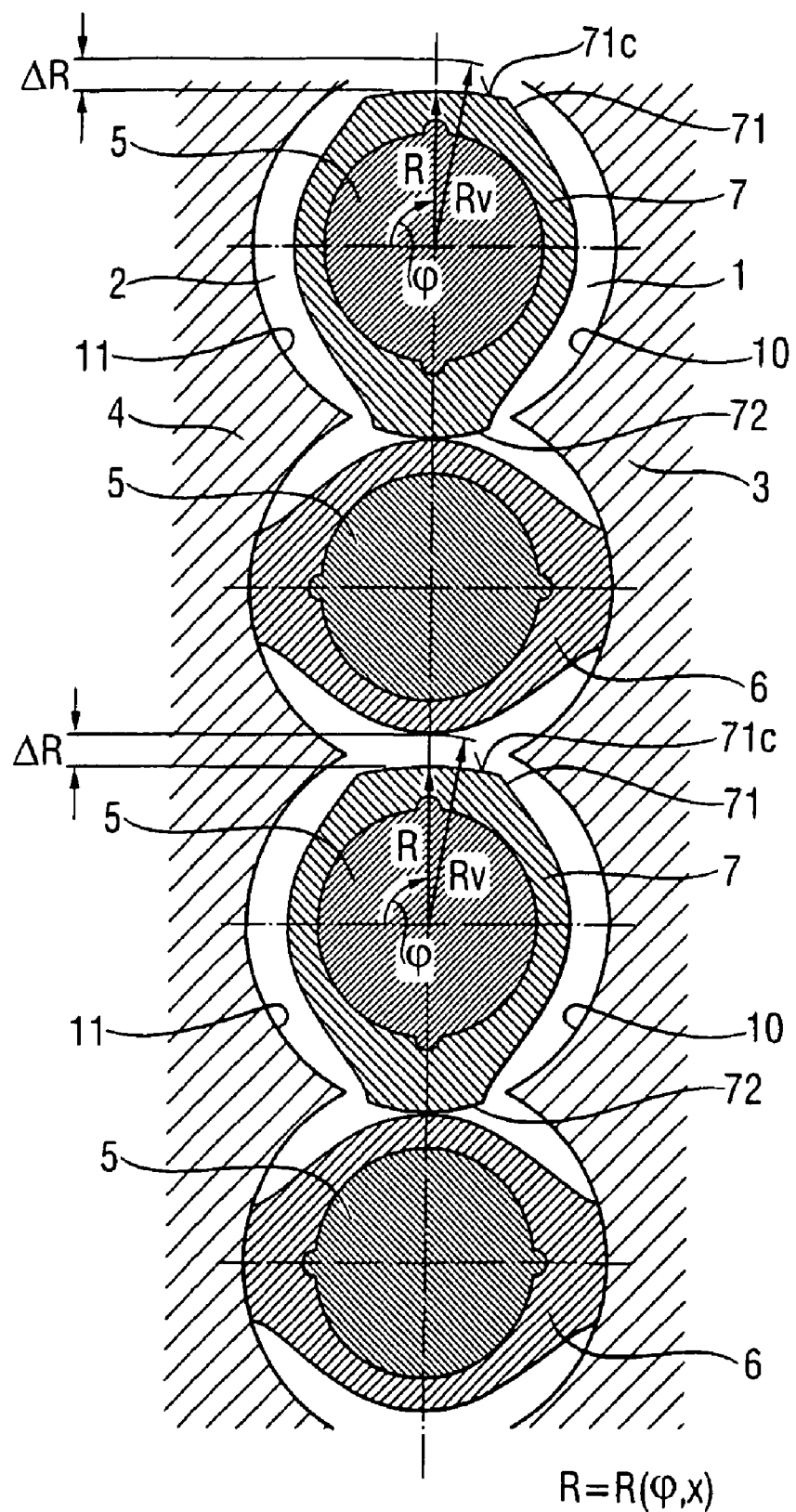
FIG. 3 is a sectional view of the sectional plane III-III of FIG. 2.

FIG. 3 is a sectional view of the section plane III-III of FIG. 2, the housing 3 and the core 4 of the extruder additionally being shown in this case. The neighboring screws are a passage screw and a typical screw in turn, a double-threaded conveyor element 7, in which a land is clipped in a subsection by an amount $\Delta R$ in relation to the complete radius Rv, being attached rotationally fixed on the screw rod 5 of the passage screw, while a typical conveyor element 6 without clipping, i.e., with a continuous complete radius Rv, is attached rotationally fixed on the typical screw 5.

FIG. 4 is a schematic view of a detail of the screw arrangement in a second exemplary embodiment of the multiple-screw extruder according to the present invention. Instead of the double-threaded conveyor elements 6, 7 of FIG. 2, in this case triple-threaded conveyor elements 8, 9 are used. In this case as well, passage screws are positioned alternately with typical screws. While the screw rods 5 of the typical screws carry conveyor elements 8 without any clipping, the screw rods 5 of the passage screw carry conveyor elements 9 having partial clipping. The triple-threaded conveyor element 5 has a first land 91, a second land 92, and a third land 93, between which a first thread 94, a second thread 95, and a third thread 96 are implemented. In the present case, the first land 91 of the conveyor element 9 is clipped in subsections 91a, 91b, 91c, 91d and 91e of the first land 91 by an amount ΔR in relation to the complete radius Rv. In this case as well, the clipped subsections of the first land 91 are each offset in relation to one another by 180° around the circumference of the conveyor element 9. In this case as well, material exchange along the lengthwise direction A between the thread 94 and the thread 96 of the conveyor element 9 and between the first process chamber 1 (below the plane of the drawing) and the second process chamber 2 (above the plane of the drawing) is allowed by the connection openings 91a, 91b, 91c, 91d and 91e.

FIG. 5 is a sectional view of the sectional plane V-V of FIG. 4. FIG. 5 essentially corresponds to FIG. 3, the double-threaded conveyor elements 6 (without clipping) and 7 (with clipping) merely being replaced by triple-threaded conveyor elements 8 (without clipping) and 9 (with clipping). All further reference numbers and/or elements of FIG. 5 correspond to the same reference numbers and/or elements of FIG. 3.

In order to also allow material exchange between all threads 94, 95 and 96 along the lengthwise direction A in the second exemplary embodiment (FIGS. 4 and 5), in addition to the land 91, the land 92 or the land 93 must be clipped in at least one subsection.

Depending on the properties of the viscous or viscoelastic mass to be processed, the clipped regions 71a, 71b, 71c, 71d and 71e of the first land 71 of the double-threaded conveyor element 7 may also extend over a larger region around the circumference.

The same also applies for the clipped regions 91a, 91b, 91c, 91d and 91e of the first land 91 of the triple-threaded conveyor elements 9 of the second exemplary embodiment (FIGS. 4 and 5). In this case as well, the clipped regions of the first land 91 may extend over a larger peripheral region of the triple-threaded conveyor element 9. In the extreme case, the first land 91 of the triple-threaded conveyor element 9 may also be completely removed, for example.

Both for the first and the second exemplary embodiment, having double-threaded and triple-threaded conveyor elements, respectively, it is not absolutely necessary for the particular clipped conveyor elements 7 and 9 to alternate with unclipped conveyor elements 6 and 8, respectively. Thus, for example, all of the conveyor elements may be partially clipped or only every third or even every fourth conveyor element of the neighboring screws may be clipped, etc.

In the figures, the differential radius ΔR and/or the radius R of the conveyor element may be described formally as a function R (φ, x) of the peripheral angle φ around the circumference of the conveyor element and of the axial location x along the axial lengthwise direction of the conveyor element.

The invention claimed is:

1. A ring extruder comprising
a housing;
a core concentrically within said housing; and
a plurality of screws disposed in parallel between said housing and said core and circumferentially about said core to define an outer annular process chamber for passage of a material between said housing and said screws and an inner annular process chamber for passage of a material between said core and said screws, each pair of adjacent screws having at least one thread thereon disposed in overlapping relation with a thread of the adjacent screw for mutual stripping of adhering material, said one thread of one of said screws having a circumferential portion of reduced radius ΔR to define a transverse passage for a material exchange between said outer process chamber and said inner process chamber, said one screw being a double-threaded screw, in which the radius of a first land is a smaller radius than the complete radius and the radius of a second land is the complete radius.

2. A ring extruder as set forth in claim 1 characterized in that said reduced radius ΔR of said one screw is a function of the peripheral angle φ around the circumference of said one screw and a function of the axial location x along the axial lengthwise direction of said one screw.

3. A ring extruder as set forth in claim 1 wherein said reduced radius ΔR is a symmetrical function of the peripheral angle φ over a complete circumference (0<φ<360°) of said one thread of said one screw.

4. A ring extruder as set forth in claim 1 wherein said thread of said one screw has a plurality of circumferential portions of reduced radius ΔR disposed at 180° spacings from each other.

* * * * *